(12) United States Patent
Coffman et al.

(10) Patent No.: US 10,135,738 B2
(45) Date of Patent: Nov. 20, 2018

(54) END-TO-END NETWORK PATH SELECTION

(71) Applicant: Cisco Technology, Inc., San Jose, CA (US)

(72) Inventors: James E. Coffman, Boulder, CO (US); Herbert Wildfeuer, Los Altos, CA (US); Glen Lavers, Portland, OR (US); Kenneth A. Morneault, Watkinsville, GA (US); Matthew J. Richards, Chinnor (GB)

(73) Assignee: Cisco Technology, Inc., San Jose, CA (US)

( * ) Notice: Subject to any disclaimer, the term of this patent is extended or adjusted under 35 U.S.C. 154(b) by 117 days.

(21) Appl. No.: 15/082,608

(22) Filed: Mar. 28, 2016

(65) Prior Publication Data

US 2017/0279726 A1 Sep. 28, 2017

(51) Int. Cl.
*H04L 12/801* (2013.01)
*H04L 12/707* (2013.01)
*H04L 12/721* (2013.01)

(52) U.S. Cl.
CPC ............. *H04L 47/18* (2013.01); *H04L 45/22* (2013.01); *H04L 45/38* (2013.01)

(58) Field of Classification Search
None
See application file for complete search history.

(56) References Cited

U.S. PATENT DOCUMENTS 9,038,151 B1 * 5/2015 Chua .................. H04L 45/02
709/223
2016/0006672 A1 * 1/2016 Saavedra ................ H04L 49/00
370/401
2016/0028625 A1 * 1/2016 Hari ........................ H04L 45/74
370/392
2016/0330106 A1 * 11/2016 Menezes .................. H04L 45/22
2016/0344615 A1 * 11/2016 Hao ....................... H04L 45/124
2017/0171310 A1 * 6/2017 Gardner .............. H04L 67/1097
2017/0222912 A1 * 8/2017 Atkinson ................ H04L 43/16

OTHER PUBLICATIONS

Saurav Das, "PAC.C: A Unified Control Architecture for Packet and Circuit Network Convergence: Chapter 5—Introducing SDN Control in MPLS Networks," Stanford University, Jun. 2012, 46 pages.
Suneth Namal et al., "SDN Based Inter-Technology Load Balancing Leveraged by Flow Admission Control", Centre For Wireless Communications, University of Oulu, www.cwc.oulu.fi, 2013 IEEE SDN for Future Networks and Services (SDN4FNS), Nov. 11-13, 2013, 13 pages.
Mark Mitchiner et al., "Software-Defined Networking and Network Programmability: Use Cases for Defense and Intelligence Communities", White Paper, C11-730834-00, Jan. 2014, 22 pages.

* cited by examiner

*Primary Examiner* — Eunsook Choi
(74) *Attorney, Agent, or Firm* — Edell, Shapiro & Finnan, LLC

(57) ABSTRACT

Presented herein are techniques for application criteria-based path selection in a network. An application controller receives endpoint application criteria that specify end-to-end conditions that at least one network is to satisfy when forwarding the at least one packet flow. The application controller evaluates a plurality of different types of end-to-end network paths to determine whether one or more of the plurality of end-to-end network paths satisfies the endpoint application criteria.

24 Claims, 5 Drawing Sheets

END-TO-END NETWORK PATH SELECTION

TECHNICAL FIELD

The present disclosure relates to network path selection.

BACKGROUND

Software-defined networking (SDN) is a networking architecture that decouples the network control and data/forwarding planes. Since the network control and forwarding functions are decoupled, SDN enables the network control to become directly programmable and the underlying infrastructure to be abstracted for applications and network services

DESCRIPTION OF EXAMPLE EMBODIMENTS

Overview

Presented herein are techniques for application criteria-based path selection in a network. An application controller receives endpoint application criteria that specify end-to-end conditions that at least one network is to satisfy when forwarding the at least one packet flow. The application controller evaluates a plurality of different types of end-to-end network paths to determine whether one or more of the plurality of end-to-end network paths satisfies the endpoint application criteria.

Example Embodiments

Figure 1:
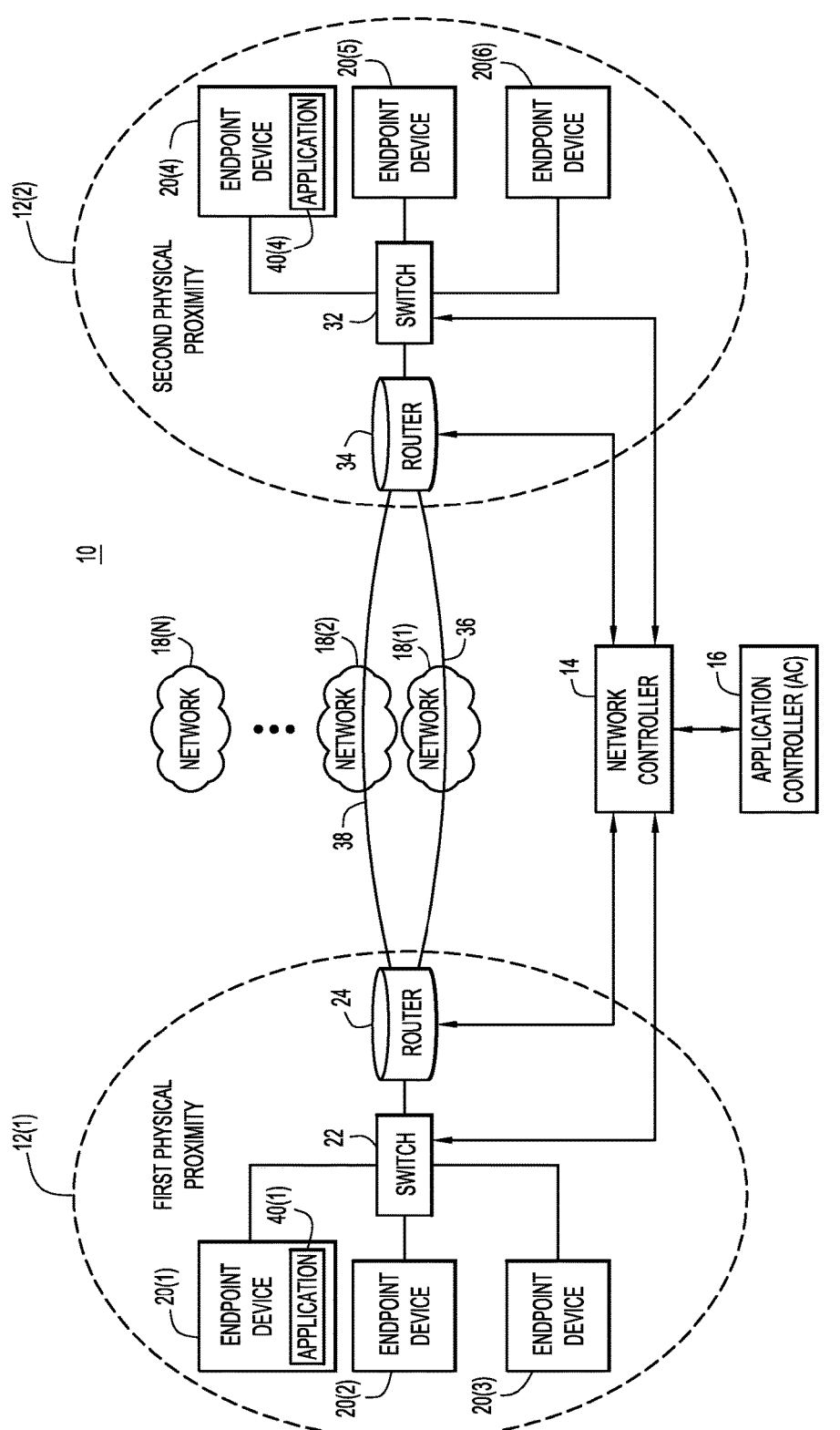
FIG. 1 is a diagram of a network configured for application criteria-based path selection, according to an example embodiment.

FIG. 1 is a block diagram of a network arrangement 10 in which application criteria-based path selection techniques presented herein may be implemented. Network arrangement 10 comprises a first site or physical proximity 12(1), a second physical proximity 12(2), a network controller 14 (e.g., a software-defined networking (SDN) controller), and an application controller (AC) 16. As used herein, a "site" or a "physical proximity" can be defined as the same computing "pod," the same building, the same physical site (e.g., data center site), the same city, etc. In general, different physical proximities refer to different clusters of computing devices. Computing devices within the same physical proximity may be interconnected by one or more local networks.

In FIG. 1, the first physical proximity 12(1) comprises endpoint devices (endpoints) 20(1), 20(2), and 20(3), a switch 22, and a routing device (router) 24. The second physical proximity 12(2) comprises endpoints 20(4), 20(5), and 20(6), a switch 32, and a router 34. Endpoints in physical proximity 12(1) send packet flows (i.e., series of packets), sometimes referred to herein as traffic, to and/or receive packet flows from, endpoints in physical proximity 12(2). The endpoints 20(1)-20(6) may comprise a number of different types of devices, such as servers, computers, mobile devices, etc. As such, the packet flows transmitted between the physical proximities 12(1) and 12(2) may also take a number of different forms. For example, a packet flow sent between the physical proximities 12(1) and 12(2) may be a real-time packet flow, such as a packet flow sent during a collaboration session, online meeting, etc. Alternatively, a packet flow sent between the physical proximities 12(1) and 12(2) may be a streaming packet flow, such as a packet sent to provide a user with pre-stored content (e.g., recordings, videos, etc.) that is delivered on-demand to the user.

The physical proximities 12(1) and 12(2) are connected with one another by one more different networks 18(1)-18(N) each formed by a plurality of networking devices (e.g., switches, routers, etc.). As such, there are a number of different end-to-end paths or routes over which packet flows may be sent between physical proximities 12(1) and 12(2). In general, the paths between two physical proximities have different performance metrics (e.g., different bandwidths, different loss characteristics (burst or statistical), different delays, etc.) associated therewith. In certain examples, one or more of end-to-end paths are different "types" of end-to-end paths, meaning that the two paths each use different forwarding mechanisms. Merely for ease of illustration, FIG. 1 illustrates only two end-to-end paths between physical proximities 12(1) and 12(2), referred to as a first end-to-end path (first path) 36 and a second end-to-end path (second path) 38. It is to be appreciated that, in practice, a larger number of paths may be provided between two physical proximities. In one specific example, path 36 is a Multiprotocol Label Switching (MPLS) path where packet flows traverse MPLS links, while path 38 is an Internet path where network nodes use the Internet Protocol suite (i.e., Transmission Control Protocol (TCP)/IP) to forward packets. MPLS links are network links where the packet flows are directed from one network node to the next based on short path labels rather than long network addresses. It is to be appreciated that the presence of an IP path and an MPLS path are merely one example and that other types of paths between proximities 12(1) and 12(2) may be available in other arrangements.

In the arrangement of FIG. 1, endpoint 20(1) in physical proximity 12(1) executes an instance of an endpoint application (application) 40 to generate data for transmission to an instance of the application 40 executed at endpoint 20(4) in physical proximity 12(2). For ease of description, the instance of application 40 executed at endpoint 20(1) is referred to as application instance 40(1), while the instance of application 40 executed at endpoint 20(4) is referred to as application instance 40(4).

The data generated by application instance 40(1) at endpoint 20(1) is used to generate one or more packet flows (i.e., one or more series of packets) that are to be sent to application instance 40(4) at endpoint 20(4). These packet flows are first forwarded to router 24. Router 24, similar to router 34, is responsible for sending packet flows over a path through the core network 18. The routers 24 and 34 have multiple interfaces on which to forward packet flows and, as such, can send packets over the first path 36 or the second path 38. As such, upon receipt of a packet flow from endpoint 20(1), the router 24 sends the flow over a selected path (e.g., either first path 36 or second path 38), which is used to carry the packet flow to router 34 and endpoint 20(4).

Traditionally, routers and other networking devices use network oriented measures (e.g., measures such as shortest queue, least cost, where cost is defined by a network administrator, etc.) to forward packet flows over a network on a hop-by-hop basis. Furthermore, some traditional routing functions depend on deep packet inspection which may limit the number of flows that can be handled and results in the inability to operate with end-to-end encryption. The hop-by-hop and/or deep pack inspection mechanisms used on traditional routing functions are independent of any specific requirements associated with the endpoint applications that generate and/or receive the packet flows that are sent over the network. That is, traditional routing focuses on the characteristics of the network itself and does not account for end-to-end measures, particularly the quality of an end-user experience associated with a packet flow. However, endpoint applications (i.e., applications executed at endpoints that send/receive packet flows) are in a unique position to determine how the actual network facilities (i.e., network nodes and links) impact the quality of the end-user experience. That is, an endpoint application has the ability to determine information representing an end-to-end view of the relative quality of a packet flow from the perspective of the endpoint (e.g., the perceived quality of the end-user experience), which is a measure networking elements cannot determine.

For example, returning to FIG. 1, the application instances 40(1) and 40(4) executed at endpoints 20(1) and 20(4), respectively, are associated with application controller 16. The application controller 16 communicates with the application instances 40(1) and 40(4) and, as such, is able to identify/receive the attributes of the endpoints themselves, such as the ability of the endpoints to remediate sub-optimal flow performance (i.e., determine the ability of the endpoints to compensate for the packet loss, jitter, delay, etc.). The application controller 16 can also determine the attributes of packet flows as received at an endpoint. The attributes of packet flows as received at an endpoint may include received packet flow bandwidth and/or effects of packet loss, jitter and delay on the end-user experience.

In accordance with the techniques presented herein, application controller 16 can use the attributes of the endpoints themselves, the attributes of received packet flows, other endpoint and/or application specific information, and/or end-to-end attributes of packet flows, collectively and generally referred to herein as endpoint application information, to generate "endpoint application criteria" or "application criteria" for packet flows associated with application 40. As used herein, the application criteria are a set of end-to-end conditions (e.g., a level of service) that a path between the physical proximities 12(1) and 12(2) is to satisfy when forwarding packet flows associated with the application 40. In other words, the application criteria specify/define, from the perspective of the application 40, what is an acceptable (successful) packet route between the physical proximities 12(1) and 12(2) to, for example, ensure a quality end-user experience at the endpoints.

Different applications will have different definitions of what constitutes an acceptable packet route between the physical proximities 12(1) and 12(2) and thus different application criteria. For example an online brokerage trading application may need a limited (e.g., small) bandwidth, but may require extremely timely delivery of packets from a first endpoint to a second endpoint. In such examples, a request from the application controller may result in the network controller actually configuring special queues on the network nodes in the path to insure timely delivery of the packets. Similarly, a streaming video application may require a specific amount of bandwidth over a long period of time, but can handle a certain amount of jitter since the receiving endpoint can buffer the video enough to allow some variation in delivery time.

Furthermore, the application criteria may depend on the application domain. For example, streaming packet flows may accept a longer end-to-end delay across the network, but will not accept packet loss (i.e., request zero or near zero packet loss). In contrast, a real-time packet flow may not tolerate end-to-end delays, but will accept greater amounts of packet loss. These application criteria do not directly correspond to hop-by-hop network metrics, but instead require a global end-to-end view of the network because, for example, the loss or delays may not occur uniformly across the path.

The network controller 14 provides an application interface (API) (not shown in FIG. 1) to the application controller 16. Using this API, the network controller 14 provides the application controller 16 with a list of available end-to-end paths between physical proximities 12(1) and 12(2), along with network metrics for these end-to-end paths. The application controller 16 then uses the application criteria for different packet flows associated with application (e.g., designate different flows between the endpoints to prefer different criteria for the selected path) to perform criteria-based path selection for the various packet flows associated with application 40. That is, the application controller 16 is made aware of the multiple available end-to-end paths (by the network controller 14) and the application controller uses the application criteria to evaluate the available end-to-end paths (i.e., evaluate the network metrics associated with the paths) to select an optimal end-to-end network path for each of the packet flows associated with application 40 (i.e., a path that most closely satisfies/meets the end-to-end requirements set forth by the application criteria). After an optimal path is selected by the application controller 16, the application controller can request the network controller 14 to instruct router 24 to use the selected end-to-end path to send traffic to the second physical proximity 12(2).

As described elsewhere herein, the application criteria specify end-to-end conditions that an end-to-end path between two physical proximities should satisfy when forwarding traffic. As such, from a high-level perspective, the networking devices forward the packet flows based on an end-to-end view of the network. The application-criteria may take a number of different forms and may include a number of different types of information. For example, the application criteria may include the total acceptable level of packet loss, total latency, and/or end-to-end bandwidth availability.

Additionally, it is to be appreciated the application-criteria do not necessarily relate to physical network properties, but may also be intangible end-to-end properties, such as the path costs (e.g., use the cheapest/least expensive path), etc. In one specific example, an intangible end-to-end property is redundancy for a traffic flow. More specifically, the application criteria may indicate a requirement that a specific traffic flow have a backup or standby path pre-selected and ready for use to forward the specific traffic flow in the even the primary path becomes unusable (i.e., an end-to-end desire for redundancy influences the path selection process). The backup path may be, for example, a pre-selected next best path such that the application must "pay" for (i.e., spend computation cycles) to work out before transmitting the traffic flow.

Figure 2:
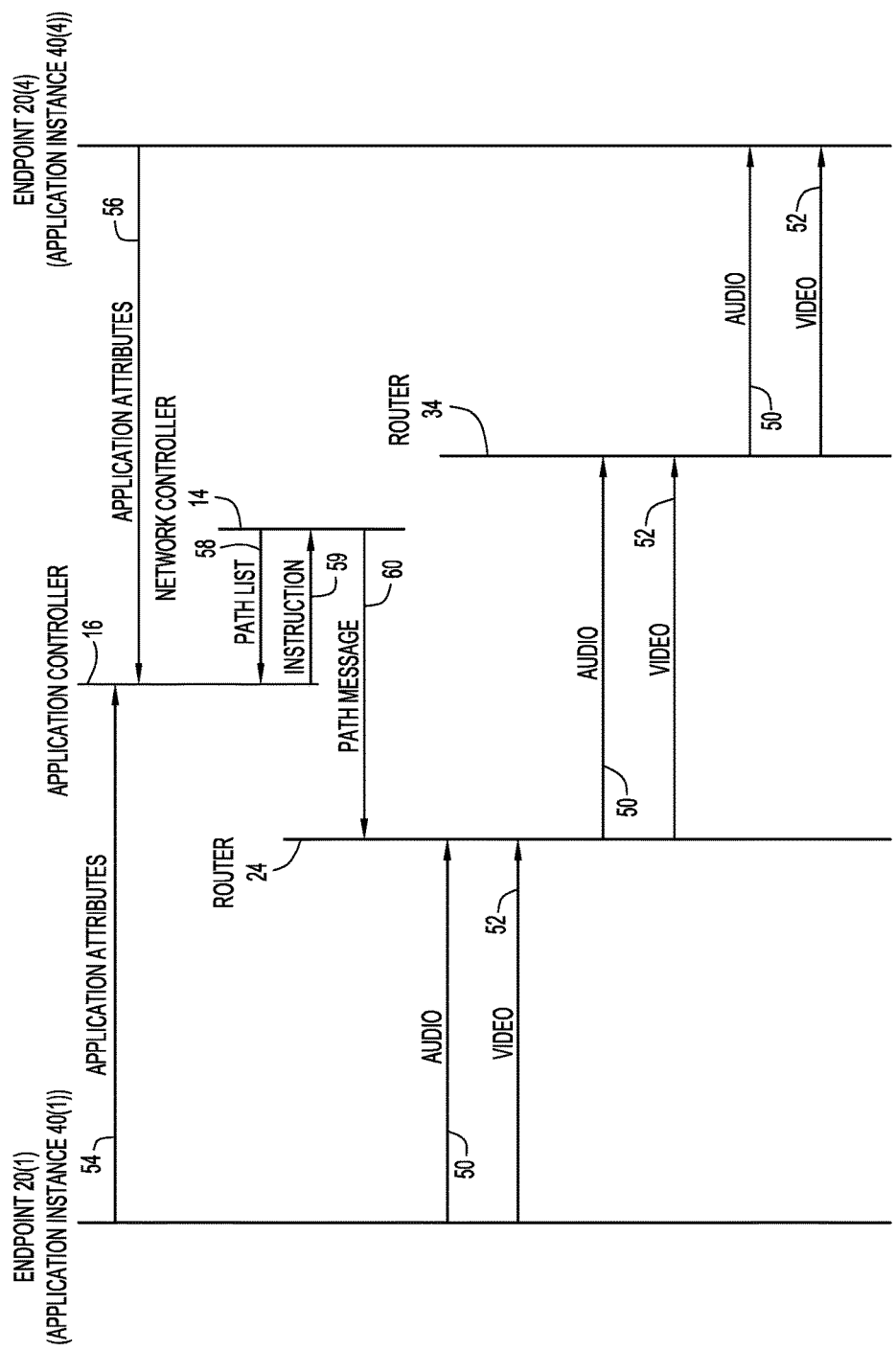
FIG. 2 is a flow diagram illustration application criteria-based path selection, according to an example embodiment.

FIG. 2 is a flow diagram illustrating example messages exchanged in accordance with the criteria-based path selection techniques presented herein. For ease of description, the flow diagram of FIG. 2 is described with reference to the arrangement of FIG. 1. In the arrangement of FIG. 2, application 40 is an online meeting application in which both audio data and video date are transmitted from endpoint 20(1) to endpoint 20(4). It is to be appreciated that the application 40 may utilize bi-directional transmission of audio and/or video via a plurality of different packet flows. However, merely for ease of illustration, FIG. 2 is described with reference to the sending of two packet flows, namely an audio packet flow and a video packet flow, from application instance 40(1) at endpoint 20(1) to application instance 40(4) at endpoint 20(4). The audio packet flow is represented in FIG. 2 by arrows 50, while the video packet flow is represented in FIG. by arrows 52. As shown, the audio packet flow 50 and the video packet flow 52 are generated at endpoint 20(1) and sent over a local network to router 24.

As noted, application controller 16 is in communication with both application instances 40(1) and 40(4) at endpoints 20(1) and 20(4), respectively. The application instances 40(1) and 40(4) send application attributes (i.e., attributes about the application, the endpoints, received packet flows, etc.) to application controller 16. The application attributes sent from application instance 40(1) (i.e., from endpoint 20(1)) are represented in FIG. 2 by arrow 54, while the application attributes sent from application instance 40(4) (i.e., from endpoint 20(4)) are represented in FIG. 2 by arrow 56.

Using the application attributes and/or other information, the application controller 16 generates application criteria for each of the audio packet flow 50 and the video packet flow 52. That is, separate sets of application criteria may be defined for these different packet flows associated with application 40.

The application controller 16 is unaware of the end-to-end paths that are available between physical proximities 12(1) and 12(2). However, the network controller 14 is aware of the actual network topology and has not only the awareness of available end-to-end paths, but also the network characteristics or metrics associated with each path. That is, the network controller 14 has visibility into the network(s) connecting the physical proximities 12(1) and 12(2) and has the ability to instruct the appropriate network elements (e.g., routers 24 and 34) to choose appropriate links for the packet flows 50 and 52. Therefore, as shown by arrow 58, the network controller 14 sends the lists of available paths and associated network metrics to the application controller 16. The application controller 16 then uses the application criteria 58 to perform application criteria-based path selection in order select optimal end-to-end paths for each of the audio packet flow 50 and the video packet flow 52.

More specifically, using the network metrics, the application controller 16 is configured to evaluate available end-to-end paths between physical proximities 12(1) and 12(2) and to determine which of end-to-end paths is best able to satisfy the application criteria 58 for each of the audio packet flow 50 and the video packet flow 52 (i.e., determine which end-to-end paths can provide the a level of service that most closely matches the level of service identified in the application criteria 58). It is to be appreciated that the evaluation of available end-to-end paths and the path selection by application controller 16 is not performed for each packet flow in isolation. Instead, the application controller 16 is configured to account for each of the audio packet flow 50 and the video packet flow 52, as well as any other packet flows across core network, in view of the utilized and available capabilities of the various end-to-end paths.

In the example of FIG. 2, the application controller 16 determines that it is not possible to satisfy the application criteria 58 by sending both the audio packet flow 50 and the video packet flow 52 from endpoint 20(1) to endpoint 20(4) via the same path, such as via the path 36. However, the network metrics indicate that the second path 38 has high bandwidth availability, but may be susceptible to packet loss, while the first path 36 has a smaller bandwidth availability, but low packet loss. Therefore, as a result of the application criteria-based path selection, the application controller 16 determines that the application criteria 58 can be satisfied by sending the video packet flow 52 over the path 38 since the flow consumes substantial bandwidth and can be made somewhat resilient to packet loss through forward error correction. In contrast, the network controller 14 determines that the audio packet flow 50 should be sent over the path 36 because audio data needs stricter controls on packet loss than what is need for video data. As a result, the application controller 16 can instruct the network controller 14 that path 36 is to be used for the audio packet flow 50, while path 38 should be used for the video packet flow 52. This instruction message is shown in FIG. 2 by arrow 59.

Upon receipt of the instruction message 59, the network controller 14 sends a message, illustrated in FIG. 2 by arrow 60, to the router 24 that indicates the paths that should be used for the audio packet flow 50 and the video packet flow 52. The router 24 then uses the path 38 to send the video packet flow 52 to router 34, and uses the path 36 to send the audio packet flow 50 to router 34. Router 34 then sends the video packet flow 52 and the audio packet flow 50 to endpoint 20(4) over a local network within physical proximity 12(2).

As noted above, during the application criteria-based path selection process, the application controller 16 determines which end-to-end paths satisfies/matches application criteria associated with a packet flow. A determination that a path satisfies application criteria may be made in a number of different manners. In one specific example, a path may be determined to satisfy the application criteria when the path's capabilities exceed a specific percentage or threshold level of various application criteria. In certain examples, application criteria may be weighted differently and the capabilities of the end-to-end paths scored. The path with the highest relative score may be determined as the end-to-end path that satisfies (i.e., best matches) the application criteria.

It certain examples, network conditions may change during the lifetime of a packet flow and, as a result, network resources that are used by a flow could become unavailable. In such examples, the network controller 14 and/or the application instances 40(1) and 40(4) can inform the application controller 16 of the network changes. For example, the endpoint 20(2) may, for example, periodically, report back to the application controller 16 with how well the received video packet flow 52 and the audio packet flow 50 are performing with respect to the application criteria. If the received flows do not satisfy the application criteria and/or the application criteria changes (e.g., decrease in acceptable levels of packet loss), then the application controller 16 can dynamically initiate remediation for the affected packet flows.

Figure 3:
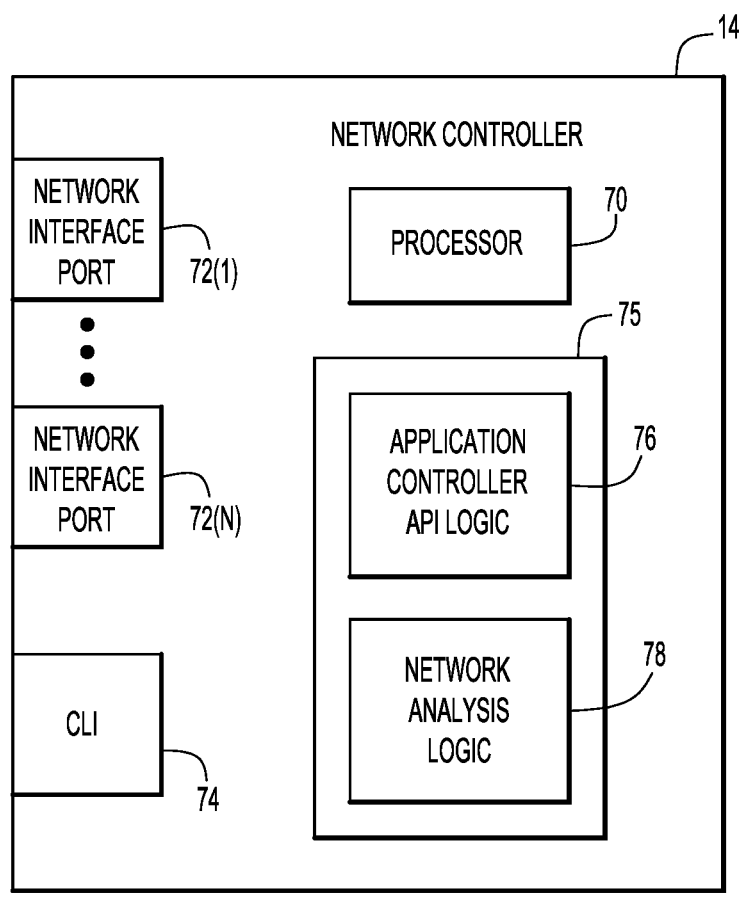
FIG. 3 is a block diagram of a network controller, according to an example embodiment.

FIG. 3 is a block diagram illustration on example arrangement for network controller 14 in accordance with examples presented herein. As shown, network controller 14 comprises a processor 70, a plurality of network interface ports (network interfaces) 72(1)-72(N), a command-line interface (CLI) 74, and a memory 75. Memory 75 comprises application controller API logic 76 and network analysis logic 78.

The network interface ports 72(1)-72(N) provide network communications between the network controller 14 and one or more of the network components, such as routers 24 and 34 and application controller 16. Network interface ports 72(1)-72(N) may be, for example, Ethernet ports of a network interface card (NIC) implemented in one or more application-specific integrated circuits (ASICs). The CLI 84 is a mechanism by which commands can be delivered to the network controller 14 in the form of successive lines of text (command lines).

The memory 75 may be read only memory (ROM), random access memory (RAM), magnetic disk storage media devices, optical storage media devices, flash memory devices, electrical, optical, or other physical/tangible memory storage devices. Thus, in general, the memory 75 may comprise one or more tangible (non-transitory) computer readable storage media (e.g., a memory device) encoded with software comprising computer executable instructions and when the software is executed (by the processor 70) it is operable to perform the operations described herein. In particular, the network controller 14 performs the operations described above in connection with FIGS. 1 and 2 when executing the software (i.e., application controller API logic 76 and network analysis logic 78) stored in memory 75.

Figure 4:
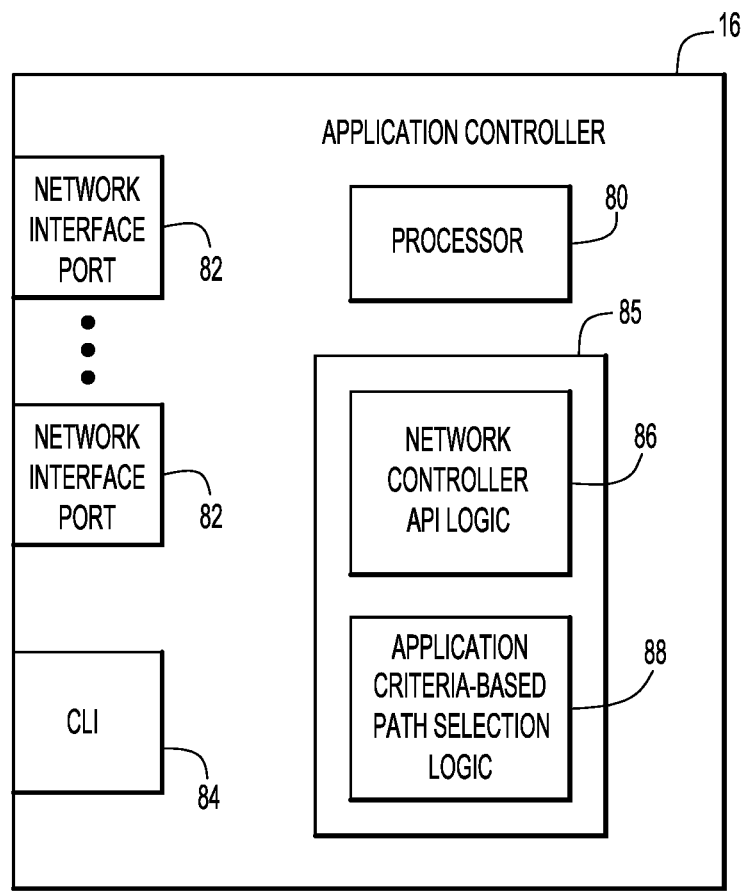
FIG. 4 is a block diagram of an application controller, according to an example embodiment.

FIG. 4 is a block diagram illustration on example arrangement for application controller 16 in accordance with examples presented herein. As shown, application controller 16 comprises a processor 80, a plurality of network interface ports (network interfaces) 82(1)-82(N), a CLI 84, and a memory 85. Memory 85 comprises network controller API logic 86 and application criteria-based path selection logic 88.

The network interface ports 82(1)-82(N) provide network communications between the application controller 16 and one or more of the network components, such as endpoint devices 20(1)-20(6) and network controller 14. Similar to network interface ports 72(1)-72(N) of FIG. 3, the network interface ports 82(1)-82(N) may be, for example, Ethernet ports of a NIC. The CLI 84, similar to CLI 74 of FIG. 3, is a mechanism by which commands can be delivered to the application controller 16.

The memory 85 may be ROM, RAM, magnetic disk storage media devices, optical storage media devices, flash memory devices, electrical, optical, or other physical/tangible memory storage devices. Thus, in general, the memory 85 may comprise one or more tangible (non-transitory) computer readable storage media (e.g., a memory device) encoded with software comprising computer executable instructions and when the software is executed (by the processor 80) it is operable to perform the operations described herein. In particular, the application controller 16 performs the operations described above in connection with FIGS. 1 and 2 when executing the software (i.e., network controller API logic 86 and application criteria-based path selection logic 88) stored in memory 85.

Figure 5:
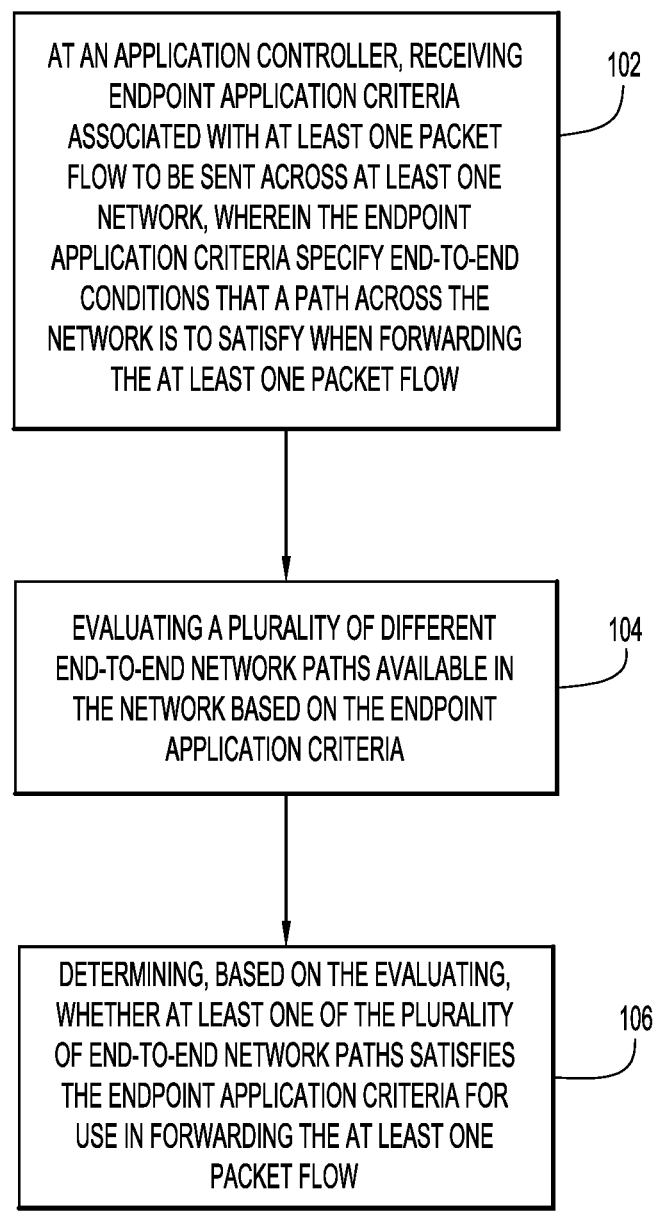
FIG. 5 is a flowchart of a method, according to an example embodiment.

FIG. 5 is a flowchart of method 100 in accordance with examples presented herein. Method 100 begins at 102 where an application controller, receives endpoint application criteria associated with at least one packet flow to be sent between endpoints across one or more networks. The endpoint application criteria specify end-to-end conditions that a path across the one or more networks is to satisfy when forwarding the at least one packet flow. At 104, the application controller evaluates a plurality of different end-to-end network paths available in the network based on the endpoint application criteria. At 106, the application controller determines, based on the evaluating, whether at least one of the plurality of end-to-end network paths satisfies the endpoint application criteria for use in forwarding the at least one packet flow between the endpoints.

As described above, the application criteria-based path selection techniques presented herein provide a capability by which an application controller can select forwarding paths based on end-to-end criteria that an application needs to balance in order to deliver high quality flows from one endpoint to another. Also as described above, the application criteria-based path selection is based on an end-to-end view of the quality of the available paths. This is contrast to traditional routing algorithms that use a next-hop view in routing packet flows where only the next hop behavior is taken into account before sending a packet flow. The quality of the available paths from the endpoint's point of view is dependent on how all hops along the path collectively perform (i.e., an aggregate end-to-end view). The techniques presented herein also allow the network to differentiate between different types of packet flows associated with the same application (i.e., each packet flow may have its own associated application criteria). This is in contrast to traditional network routing procedures that do not differentiate between flows from one endpoint to another.

Thus, in summary, in one form, a method is provided comprising: at an application controller, receiving endpoint application criteria associated with at least one packet flow to be sent across at least one network, wherein the endpoint application criteria specify end-to-end conditions that a path across the network is to satisfy when forwarding the at least one packet flow; evaluating a plurality of different end-to-end network paths available in the network based on the endpoint application criteria; and determining, based on the evaluation, whether at least one of the plurality of end-to-end network paths satisfies the endpoint application criteria for use in forwarding the at least one packet flow.

In another embodiment, an apparatus is provided comprising: one or more network interface ports; a memory; and a processor configured to: receive endpoint application criteria associated with at least one packet flow to be sent across at least one network, wherein the endpoint application criteria specify end-to-end conditions that a path across the network is to satisfy when forwarding the at least one packet flow, evaluate a plurality of different end-to-end network paths available in the network based on the endpoint application criteria, and determine, based on the evaluation, whether at least one of the plurality of end-to-end network paths satisfies the endpoint application criteria for use in forwarding the at least one packet flow.

In still another form, one or more non-transitory computer readable storage media are provided that are encoded with instructions that, when executed by a processor, cause the processor to: receive endpoint application criteria associated with at least one packet flow to be sent across at least one network, wherein the endpoint application criteria specify end-to-end conditions that a path across the network is to satisfy when forwarding the at least one packet flow; evaluate a plurality of different end-to-end network paths available in the network based on the endpoint application criteria; and determine, based on the evaluation, whether at least one of the plurality of end-to-end network paths satisfies the endpoint application criteria for use in forwarding the at least one packet flow.

As explained above, when it is determined that at least one of the plurality of end-to-end network paths satisfies the endpoint application criteria, one of the at least one of the plurality of end-to-end network paths is selected that satisfies the application criteria as a selected end-to-end path for use in forwarding the least one packet flow across the network.

The method may further involve monitoring the status of the at least one packet flow relative to the endpoint application criteria when the at least one packet flow is forwarded on the selected end-to-end path to confirm that the selected end-to-end path continues to satisfy the endpoint application criteria.

An indication of the plurality of different end-to-end network paths may be received from a network controller and wherein the endpoint application criteria is generated based on information received from one or more endpoint devices that at least one of send or receive the at least one packet flow.

Evaluating the plurality of different end-to-end network paths available in the network based on the endpoint application criteria, may involve determining which one of the plurality of different end-to-end network paths has associated network metrics that most closely satisfy end-to-end requirements set forth by the application criteria.

The endpoint application criteria may define, from the perspective of an application, an acceptable packet route through the at least one network. The endpoint application criteria may relate to intangible end-to-end properties. For example, the endpoint application criteria may indicate a requirement that the at least one packet flow have a backup path pre-selected and ready for use to forward the at least one packet flow in the event the primary path becomes unusable.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at an application controller:
    receiving endpoint application criteria associated with a user-based application configured to send packet flows across at least one network, wherein the endpoint application criteria define, from the perspective of the user-based application, end-to-end conditions that a path across the network is to satisfy when forwarding the packet flows in order to ensure an acceptable quality end-user experience defined for the user-based application, and wherein the endpoint application criteria indicate a requirement for pre-selection of a backup end-to-end path for use in forwarding the packet flows in the event a primary end-to-end path becomes unusable;
    evaluating a plurality of different end-to-end network paths available in the network based on the endpoint application criteria;
    selecting, based on the evaluating, a first one of the plurality of end-to-end network paths that satisfies the application criteria as the primary end-to-end path;
    forwarding the packet flows across the network using the primary end-to-end network path; and
    selecting, based on the evaluating, a second one of the plurality of end-to-end network paths that satisfies the application criteria as a pre-selected backup end-to-end path for use in forwarding the packet flows across the network in the event the primary end-to-end path becomes unusable.

2. The method of claim 1, wherein the endpoint application criteria specify that the primary end-to-end path and the backup end-to-end path be different types of end-to-end paths that use different forwarding mechanisms.

3. The method of claim 1, further comprising:
    monitoring the status of the packet flows relative to the endpoint application criteria when the packet flows are forwarded on the primary end-to-end path to confirm that the primary end-to-end path continues to satisfy the endpoint application criteria.

4. The method of claim 1, wherein an indication of the plurality of different end-to-end network paths is received from a network controller and wherein the endpoint application criteria is generated based on information received from one or more endpoint devices that at least one of send or receive the packet flows.

5. The method of claim 1, wherein evaluating the plurality of different end-to-end network paths available in the network based on the endpoint application criteria, comprises:
    determining which one of the plurality of different end-to-end network paths has associated network metrics that most closely satisfy end-to-end requirements set forth by the application criteria.

6. The method of claim 1, wherein the endpoint application criteria define, from the perspective of an application, an acceptable packet route through the at least one network.

7. The method of claim 1, wherein the endpoint application criteria relate to intangible end-to-end properties.

8. The method of claim 3, further comprising:
    determining, based on the monitoring, that the primary end-to-end path no longer satisfies the endpoint application criteria; and
    automatically forwarding subsequent packet flows on the pre-selected backup end-to-end path.

9. An apparatus comprising:
    one or more network interface ports;
    a memory; and
    a processor configured to:
    receive endpoint application criteria associated with a user-based application configured to send packet flows across at least one network, wherein the endpoint application criteria define, from the perspective of the user-based application, end-to-end conditions that a path across the network is to satisfy when forwarding the packet flows in order to ensure an acceptable quality end-user experience defined for the user-based application, and wherein the endpoint application criteria indicate a requirement for pre-selection of a backup end-to-end path for use in forwarding the packet flows in the event a primary end-to-end path becomes unusable,
    evaluate a plurality of different end-to-end network paths available in the network based on the endpoint application criteria,
    select, based on the evaluating, a first one of the plurality of end-to-end network paths that satisfies the application criteria as the primary end-to-end path;
    forward the packet flows across the network using the primary end-to-end path; and
    select, based on the evaluating, a second one of the plurality of end-to-end network paths that satisfies the application criteria as a pre-selected backup end-to-end path for use in forwarding the packet flows across the network in the event the primary end-to-end path becomes unusable.

10. The apparatus of claim 9, wherein the endpoint application criteria specify that the primary end-to-end path and the backup end-to-end path be different types of end-to-end paths that use different forwarding mechanisms.

11. The apparatus of claim 9, wherein the processor is configured to:
monitor the status of the packet flows relative to the endpoint application criteria when the packet flows are forwarded on the primary end-to-end path to confirm that the primary end-to-end path continues to satisfy the endpoint application criteria.

12. The apparatus of claim 9, wherein an indication of the plurality of different end-to-end network paths is received from a network controller and wherein the endpoint application criteria is generated based on information received from one or more endpoint devices that at least one of send or receive the packet flows.

13. The apparatus of claim 9, wherein to evaluate the plurality of different end-to-end network paths available in the network based on the endpoint application criteria, the processor is configured to:
determine which one of the plurality of different end-to-end network paths has associated network metrics that most closely satisfy end-to-end requirements set forth by the application criteria.

14. The apparatus of claim 9, wherein the endpoint application criteria define, from the perspective of an application, an acceptable packet route through the at least one network.

15. The apparatus of claim 9, wherein the endpoint application criteria relate to intangible end-to-end properties.

16. The apparatus of claim 11, wherein the processor is configured to:
determine, based on the monitoring, that the primary end-to-end path no longer satisfies the endpoint application criteria; and
automatically forward subsequent packet flows on the pre-selected backup end-to-end path.

17. One or more non-transitory computer readable storage media encoded with instructions that, when executed by a processor, cause the processor to:
receive endpoint application criteria associated with a user-based application configured to send packet flows across at least one network, wherein the endpoint application criteria define, from the perspective of the user-based application, end-to-end conditions that a path across the network is to satisfy when forwarding the packet flows in order to ensure an acceptable quality end-user experience defined for the user-based application, and wherein the endpoint application criteria indicate a requirement for pre-selection of a backup end-to-end path for use in forwarding the packet flows in the event a primary end-to-end path becomes unusable;
evaluate a plurality of different end-to-end network paths available in the network based on the endpoint application criteria;
select, based on the evaluating, a first one of the plurality of end-to-end network paths that satisfies the application criteria as the primary end-to-end path;
forward the packet flows across the network using the primary end-to-end path; and
select, based on the evaluating, a second one of the plurality of end-to-end network paths that satisfies the application criteria as a pre-selected backup end-to-end path for use in forwarding the packet flows across the network in the event the primary end-to-end path becomes unusable.

18. The non-transitory computer readable storage media of claim 17, wherein the endpoint application criteria specify that the primary end-to-end path and the backup end-to-end path be different types of end-to-end paths that each use different forwarding mechanisms.

19. The non-transitory computer readable storage media of claim 17, further comprising instructions that cause the processor to:
monitoring the status of the packet flows relative to the endpoint application criteria when the packet flows are forwarded on the primary end-to-end path to confirm that the primary end-to-end path continues to satisfy the endpoint application criteria.

20. The non-transitory computer readable storage media of claim 17, wherein an indication of the plurality of different end-to-end network paths is received from a network controller and wherein the endpoint application criteria is generated based on information received from one or more endpoint devices that at least one of send or receive the packet flows.

21. The non-transitory computer readable storage media of claim 17, wherein the instructions that cause the processor to evaluate the plurality of different end-to-end network paths available in the network based on the endpoint application criteria, comprise instructions that cause the processor to:
determine which one of the plurality of different end-to-end network paths has associated network metrics that most closely satisfy end-to-end requirements set forth by the application criteria.

22. The non-transitory computer readable storage media of claim 17, wherein the endpoint application criteria define, from the perspective of an application, an acceptable packet route through the at least one network.

23. The non-transitory computer readable storage media of claim 17, wherein the endpoint application criteria relate to intangible end-to-end properties.

24. The method of non-transitory computer readable storage media of claim 19, further comprising instructions that cause the processor to:
determine, based on the monitoring, that the primary end-to-end path no longer satisfies the endpoint application criteria; and
automatically forward subsequent packet flows on the pre-selected backup end-to-end path.

\* \* \* \* \*